(12) United States Patent
Schneider et al.

(10) Patent No.: US 11,845,688 B2
(45) Date of Patent: *Dec. 19, 2023

(54) GLASS CERAMIC WITH ION-CONDUCTING RESIDUAL GLASS PHASE AND PROCESS FOR THE PRODUCTION THEREOF

(71) Applicant: SCHOTT AG, Mainz (DE)

(72) Inventors: Meike Schneider, Taunusstein (DE); Andreas Roters, Mainz (DE); Jörg Schumacher, Kornwestheim (DE); Rolf Samsinger, Rüsselsheim /M. (DE)

(73) Assignee: SCHOTT AG, Mainz (DE)

(*) Notice: Subject to any disclaimer, the term of this patent is extended or adjusted under 35 U.S.C. 154(b) by 8 days.

This patent is subject to a terminal disclaimer.

(21) Appl. No.: 17/472,824

(22) Filed: Sep. 13, 2021

(65) Prior Publication Data

US 2021/0403372 A1    Dec. 30, 2021

Related U.S. Application Data

(63) Continuation of application No. 16/266,552, filed on Feb. 4, 2019, now Pat. No. 11,136,261.

(30) Foreign Application Priority Data

Feb. 2, 2018  (DE) .................... 10 2018 102 387.1

(51) Int. Cl.
*C03C 10/00* (2006.01)
*C03C 3/21* (2006.01)
(Continued)

(52) U.S. Cl.
CPC ................ *C03C 10/00* (2013.01); *C03C 3/21* (2013.01); *C03C 4/18* (2013.01); *H01M 6/185* (2013.01);
(Continued)

(58) Field of Classification Search
CPC ................................. C03C 4/18; H01M 6/185
See application file for complete search history.

(56) References Cited

U.S. PATENT DOCUMENTS

| | | | |
|---|---|---|---|
| 5,702,995 A | 12/1997 | Fu | |
| 6,030,909 A | 2/2000 | Fu | |

(Continued)

FOREIGN PATENT DOCUMENTS

| | | |
|---|---|---|
| CN | 102456918 | 5/2012 |
| CN | 105683105 | 6/2016 |

(Continued)

OTHER PUBLICATIONS

K. Arbi et al., "High lithium ion conducting solid electrolytes based on NASICON Li1+xAlxM2-x(PO4)3 materials (M = Ti, Ge and $0 \leq x \leq 0.5$)", Journal of the European Ceramic Society 35 (2015) 1477-1484.

(Continued)

*Primary Examiner* — Karl E Group
(74) *Attorney, Agent, or Firm* — Ruggiero McAllister & McMahon LLC

(57) ABSTRACT

The present disclosure relates to a lithium ion-conducting glass ceramic which comprises a residual glass phase that is also ion-conducting, a process for the production thereof as well as its use in a battery. The glass ceramic according to the present disclosure comprises a main crystal phase which is isostructural to the NaSICon crystal phase, wherein the composition can be described with the following formula: $Li_{1+x-y}M_y^{5+}M_x^{3+}M_{2-x-y}^{4+}(PO_4)_3$, wherein x is greater than 0 and at most 1, as well as greater than y. Y may take values of between 0 and 1. Here, the following boundary condition has to be fulfilled: $(1+x-y) > 1$. Here, M represents a cation with the valence of +3, +4 or +5. $M^{3+}$ is selected from Al, Y, Sc or B, wherein at least Al as trivalent cation is present. Independently thereof, $M^{4+}$ is selected from Ti, Si or Zr, (Continued)

wherein at least Ti as tetravalent cation is present. Independently thereof, $M^{5+}$ is selected from Nb or Ta.

22 Claims, 4 Drawing Sheets

(51) Int. Cl.
  *C03C 4/18* (2006.01)
  *H01M 10/0562* (2010.01)
  *H01M 6/18* (2006.01)
  *H01M 10/052* (2010.01)

(52) U.S. Cl.
  CPC ....... *H01M 6/188* (2013.01); *H01M 10/0562* (2013.01); *H01M 10/052* (2013.01); *H01M 2300/0068* (2013.01)

(56) References Cited

U.S. PATENT DOCUMENTS

| | | |
|---|---|---|
| 7,211,532 B2 | 5/2007 | Fu |
| 11,136,261 B2 * | 10/2021 | Schneider ............ H01M 6/188 |
| 2003/0205467 A1 | 11/2003 | Fu |
| 2007/0202400 A1 | 8/2007 | Yoshida et al. |
| 2009/0239152 A1 | 9/2009 | Katoh |
| 2011/0003212 A1 | 1/2011 | Sato et al. |
| 2012/0015234 A1 | 1/2012 | Iwaya et al. |
| 2012/0231349 A1 | 9/2012 | Moon et al. |
| 2012/0237834 A1 | 9/2012 | Ogasa |
| 2013/0137010 A1 | 5/2013 | Aitken et al. |
| 2014/0057162 A1 | 2/2014 | Hochrein et al. |
| 2014/0220454 A1 | 8/2014 | Furukawa et al. |
| 2015/0064576 A1 | 3/2015 | Aitken et al. |
| 2015/0333365 A1 | 11/2015 | Sano et al. |
| 2016/0329539 A1 | 11/2016 | Kawaji et al. |
| 2016/0329598 A1 | 11/2016 | Hochrein et al. |
| 2018/0123167 A1 | 5/2018 | Guo et al. |
| 2018/0138542 A1 | 5/2018 | Bunte et al. |

FOREIGN PATENT DOCUMENTS

| | | |
|---|---|---|
| CN | 106876707 | 6/2017 |
| JP | 2-225310 | 9/1990 |
| JP | 2-302307 | 12/1990 |
| JP | 9-142874 | 6/1997 |
| JP | 2013-155068 | 8/2013 |
| JP | 2013-199386 | 10/2013 |
| JP | 2014-508707 | 4/2014 |
| JP | 2016-51566 | 4/2016 |
| JP | 2016-103381 | 6/2016 |
| JP | 2016-155707 | 9/2016 |
| KR | 20160053147 | 5/2016 |
| WO | 2013175993 | 11/2013 |
| WO | 2013180658 | 12/2013 |
| WO | 2015144074 | 10/2015 |
| WO | 2016/206430 | 12/2016 |
| WO | 2017141742 | 8/2017 |

OTHER PUBLICATIONS

Yu et al., "Influence of microstructure and AlPO4 secondary-phase on the ionic conductivity of Li1.3A10.31-11.7(PO4)3 solid-state electrolyte", Functional Materials Letters, vol. 09, No. 05, 1650066 (2016), World Scientific Publishing Co lte Ltd, 2 pages (abstract).

* cited by examiner

GLASS CERAMIC WITH ION-CONDUCTING RESIDUAL GLASS PHASE AND PROCESS FOR THE PRODUCTION THEREOF

CROSS-REFERENCE TO RELATED APPLICATION

The present application is a continuation that claims the benefit under 35 U.S.C. § 120 of U.S. patent application Ser. No. 16/266,552, filed Feb. 4, 2019, issued as U.S. Pat. No. 11,136,261 B2 on Oct. 5, 2021, which in turn claims the benefit under 35 U.S.C. § 119 of German patent application no. DE 10 2018 102 387.1, filed on Feb. 2, 2018, each of which is herein incorporated by reference.

BACKGROUND OF THE DISCLOSURE

1. Field of the Disclosure

The disclosure relates to a lithium ion-conducting glass ceramic which comprises a residual glass phase that is also ion-conducting, a process for the production thereof, and its use.

2. Description of the Related Knowledge

Lithium ion batteries and future battery generations, such as lithium-air batteries, lithium-sulfur batteries or all-solid-state batteries (ASSB), also, besides an energy density which is as high as possible, have to fulfil high requirements with respect to safety and reliability which have to be guaranteed over the whole operating life. Here, in the past, liquid electrolytes often have shown a negative performance, because they are highly flammable and show a tendency to decomposition which may result in a loss of conductivity and/or undesired degradation products.

Since the 1980s, lithium ion-conducting glass ceramics have been researched with respect to the use as solid-state electrolytes. Here, in particularly glass ceramics with a crystal phase of $Li_{1+x-y}M_y^{5+}M_x^{3+}M_{2-x-y}^{4+}(PO_4)_3$ which is isostructural to NaSICon (Natrium Super Ionic Conductor) are of interest, because e.g. in the composition $Li_{1.3}Al_{0.3}Ti_{1.7}(PO_4)_3$ at room temperature they can reach conductivities of up to $10^{-3}$ S/cm and higher. According to the elements contained this crystal phase is often referred to as LATP (Li Al Ti P). Ion-conducting materials with NaSICon structure can be produced as ceramics, via sol-gel processes or as glass ceramics.

Normally, the ceramic production is realized via a solid-state reaction, partially with the use of sintering additives and/or binders, without homogenous melting of the material. Glass ceramics are produced by melting the raw materials to a glass and a subsequent temperature treatment during which the desired crystal phase crystallizes. Therefore, the final material consists of a crystal phase, wherein the proportion thereof can be adjusted via the ceramization process, and of an amorphous proportion which is often referred to as residual glass phase. In the context of this application both terms are used in a synonymous manner.

Here, the production as glass ceramic is connected with the advantage of easy scalability which allows a cost-efficient industrial production. Furthermore, the shaping possibilities known from glass industry can be used. In addition, in this process the costs of the raw materials can be reduced by the use of recycling material or waste material from the production process.

However, in the case of the production of the glass ceramics with a NaSICon-like crystal phase it is disadvantageous that the glass phase only exhibits an extremely low lithium ion conductivity in the order of $<10^{-10}$ S/cm. Thus, the total conductivity of the material becomes lowered, partially more than one order of magnitude. Although it is possible to reduce this problem by a nearly complete avoidance of amorphous proportions in the final product, often a thin amorphous layer remains between the crystallites, which impedes the ionic conduction. In addition, for achieving a crystallization which is as complete as possible, long ceramization times and/or high temperatures have to be used which increases the energy costs of the production.

The use of solid electrolytes such as the described glass ceramics is realized either in the form of a powder which becomes embedded into a polymer or in the form of a sintered material which is often produced with the help of a tape casting process and a subsequent sintering process. In this connection, the presence of an amorphous phase results in a reduction of the sintering temperatures, but, however, the poor conductivity of the amorphous phase may also here result in an isolating layer between the crystallites, which lowers the conductivity of the sintered product.

On the other hand, in the case of embedment into a polymer, the low conductivity of the amorphous phase may result in a considerable increase of the transfer resistance between the polymer and the ion-conducting powder.

SUMMARY OF THE DISCLOSURE

Based on the problems described it is the object of the present disclosure to find and to produce a glass ceramic which comprises an ion-conductive residual glass phase and thus allows the production of a sintered ionic conductor with high total conductivity or the embedment of a solid electrolyte powder into a polymer with low transfer resistance.

Starting glasses which are suitable for the conversion (ceramization) into glass ceramics according to the present disclosure should have a sufficient crystallization stability so that it is possible to produce them preferably from a glass melt by hot shaping, in particularly by casting. At the same time, both, the glass ceramics and also the starting glasses should be characterized by a sufficient chemical stability in air so that a storage without difficulties is possible. Preferably, the ceramization and/or sintering should take place at temperatures of <1000° C.

Furthermore, it should be possible that the glass ceramics according to the present disclosure preferably are used in lithium batteries, and they should allow the production of solid electrolytes with high conductivity.

This object is solved by the glass ceramics according to the present disclosure according to claim 1 which contain an ion-conductive crystal phase with NaSICon structure $Li_{1+x-y}M_y^{5+}M_x^{3+}M_{2-x-y}^{4+}(PO_4)_3$ and a conductive residual glass phase which contains $Li_2O$ and $BPO_4$ as main constituents, as well as the method for the production thereof which is described in the secondary claim. Preferred embodiment variants are subject matter of the dependent claims.

DETAILED DESCRIPTION OF THE DISCLOSURE

Figure 1:
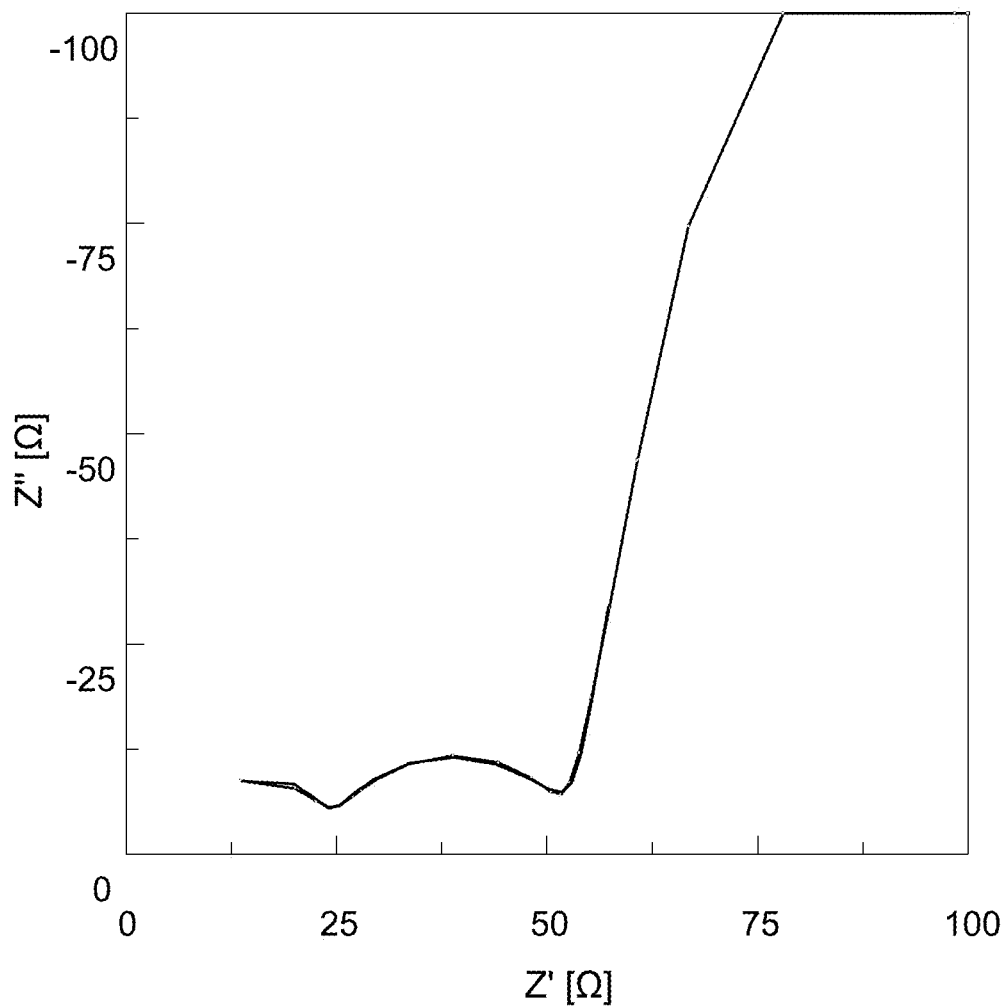
FIG. 1 shows a measuring curve of an impedance measurement of LATP materials typical for an LiSICon sample.

Hereinafter the glass ceramic according to the present disclosure and preferred embodiments are described.

The glass ceramic according to the present disclosure comprises a main crystal phase which is isostructural to the NaSICon crystal phase, wherein the composition thereof can be described with the following formula:

$$Li_{1+x-y}M_y^{5+}M_x^{3+}M_{2-x-y}^{4+}(PO_4)_3,$$

wherein x is greater than 0 and at most 1, as well as greater than y. Y may take values of between 0 and 1. The following boundary condition should be fulfilled: $(1+x-y) \geq 1$. M represents a cation with the valence of +3, +4 or +5.

$M^{3+}$ is selected from Al, Y, Sc or B, wherein at least Al as trivalent cation is present. It is preferable, that $M^{3+}$ is selected from Al, Y, Sc, wherein further preferably all three cations Al, Y, Sc are present in the glass ceramic according to the present disclosure.

Independently thereof, $M^{4+}$ is selected from Ti, Si or Zr, wherein at least Ti as tetravalent cation is present.

Independently thereof, $M^{5+}$ is selected from Nb or Ta.

In a further preferable embodiment $Al^{3+}$ is present as the sole trivalent ion.

In a further preferable embodiment $Ti^{4+}$ is the sole tetravalent cation.

Further preferably, both conditions are fulfilled, so that only $Al^{3+}$ as the sole trivalent cation is present in the glass ceramic and at the same time $Ti^{4+}$ as the sole tetravalent cation is present in the glass ceramic.

Also preferable is the following secondary condition: y=0, thus that no pentavalent cation is present in the glass ceramic.

According to a further preferable embodiment $Al^{3+}$ is the sole trivalent cation, $Ti^{4+}$ is the sole tetravalent cation and at the same time no pentavalent cation is present in the glass ceramic.

Further preferable embodiments of the glass ceramics do not contain germanium. This may result in lower costs of the materials.

Further and other preferable embodiments do not contain gallium. Gallium as raw material is much more expensive than aluminum. For gallium a positive effect with respect to the glass ceramic cannot be found. Further preferably, the glass ceramic is free of oxides of gallium.

The proportion of further crystal phases without ion-conducting properties in the glass ceramic is preferably <10% by volume, preferably <9% by volume, <8% by volume, <7% by volume, <6% by volume and particularly preferably <5% by volume. It is particularly preferable, when besides the above-described main crystal phase no further crystal phases are present.

Preferably, the residual glass phase of the glass ceramic according to the present disclosure has a lithium ion conductivity of higher than $10^{-5}$ S/cm. It substantially consists of the components $Li_2O$, $B_2O_3$ and $P_2O_5$, wherein particularly preferably only $B_2O_3$ is present in the residual glass phase. Here 'substantially' means that the proportion of other components in the residual glass phase is lower than 20%, preferably lower than 15%, further preferably lower than 10%. Since normally it is difficult to determine the composition of the residual glass phase via an analysis, for the determination of the composition a model calculation can be used. Here it is assumed that a maximum amount of LATP crystallizes and that all the rest of the components remain in the residual glass phase. As the composition of the LATP the composition of the stoichiometric crystal $Li_{1.3}Al_{0.3}Ti_{1.7}(PO_4)_3$ which corresponds to 3.75 mole % $Al_2O_3$, 16.25 mole % $Li_2O$, 37.5 mole % $P_2O_5$ and 42.5 mole % $TiO_2$ can be used. Although it is possible that the amount of Al ions being inserted into the crystal varies, such an approach allows the estimation of the main components of the residual glass phase.

An insertion of boron into the crystal phase is possible, but normally such an insertion is only observed in the case of boron contents of >4 mole %. However, these high contents result in an undesired lowering of the conductivity of the residual glass phase.

The boron content of the glass ceramic is 0.2 mole %<$B_2O_3$<4 mole %, preferably 0.3 mole %<$B_2O_3$<3 mole %, further preferably 0.5 mole %<$B_2O_3$ 2.5 mole %.

For guaranteeing that it is possible that the aluminum and the titanium being used in the glass ceramic can be completely incorporated in the crystal phase, the glass ceramic contains the above-mentioned ratio of $Al_2O_3/TiO_2$.

In a preferable embodiment the glass ceramic contains the following composition (in mole %):

1-6% of $Al_2O_3$, further preferably 2-5%,
12-28% of $Li_2O$, further preferably 15-20%,
32-42% of $P_2O_5$, further preferably 34-40%,
28-45% of $TiO_2$, further preferably 36-42%,
0.2%<$B_2O_3$<4%, further preferably 0.5<$B_2O_3$ 2.5%,
0-10% of $SiO_2$,
as well as further constituents, e.g. fining or fluxing agents, 0 to 3 mole %.

In its preferred embodiment, the glass ceramic is free of harmful substances, in particular free of halides, arsenic, antimony, cadmium and chromium, with the exception of unavoidable impurities which are introduced via raw materials in the range of <1%.

For allowing a use as electrolyte in a lithium battery, the electronic conductivity of the glass ceramic is preferably lower than the ionic conductivity, at least by a factor of $10^4$. Therefore, the glass ceramic preferably contains a proportion of polyvalent elements which is as low as possible (with the exception of titanium which functions as a crystal constituent of the main crystal phase). In particularly, the content of $Fe_2O_3$ is lower than 0.2 mole %, preferably lower than 0.1 mole %.

Preferably, the glass ceramic is obtained from a starting glass being produced from a glass melt, wherein the starting glass during a step of hot shaping of the starting glass is characterized by a negligible crystallization or a crystallization of exclusively ion-conducting crystal phases.

Furthermore, the glass ceramic is preferably obtained from a starting glass which has been formed with the help of a ribbon roller into glass ribbons, subsequently is converted into the glass ceramic by a ceramization und subsequently is ground. Also shaping processes which allow a direct production of small particles can be used (e.g. a kind of spin-cooling process). Then, the glass ceramic powder is either processed in a sintering process into a sintered body or a sintered layer or it is embedded into a polymer. Also a use in a composite, e.g. as electrode additive, is possible.

The ceramization and/or sintering are preferably conducted at temperatures of <1000° C., further preferably <950° C., particularly preferably at temperatures of 900° C.

The ion-conducting powder of the glass ceramic according to the present disclosure can be mixed with a conductive polymer or with a non-conducting polymer (optionally with further additives such as conducting salts or ionic liquids), and then shows in contact to this polymer electrolyte a low transfer resistance of <1000/cm².

Preferably, the glass ceramic according to the present disclosure can be used as constituent of a lithium battery, preferably of a lithium battery which can be recharged, as electrolyte in a lithium battery, as part of an electrode in a lithium battery, as additive to a liquid electrolyte in a lithium ion battery or as coating on an electrode in a lithium battery.

As a main crystal phase of the glass ceramic a crystal phase which is isostructural to NaSICon with the following composition is formed: $Li_{1+x-y}M_y^{5+}M_x^{3+}M_{2-x-y}^{4+}(PO_4)_3$, wherein x is greater than 0 and at most 1, as well as greater than y. Y may take values of between 0 and 1. The following boundary condition should be fulfilled: (1+x−y)>1. M represents a cation having the valence of +3, +4 or +5, wherein at least $Al^{3+}$ as trivalent ion and at least $Ti^{4+}$ as tetravalent ion are contained.

In a preferable embodiment the glass ceramic contains substantially only $Al^{3+}$ as trivalent cation and substantially only $Ti^{4+}$ as tetravalent cation.

The ratio of the oxides of the aluminum and the titanium ($Al_2O_3/TiO_2$) has a value of 0.05 to 0.1.

When further trivalent cations are present in the glass ceramic according to the present disclosure, then the ratio of the cations of aluminum ($Al^{3+}$) to the total content of 3-valent cations is greater than 0.5, preferably greater than 0.6, particularly preferably greater than 0.75.

When further tetravalent cations are present in the glass ceramic according to the present disclosure, then the ratio of the cations of titanium ($Ti^{4+}$) to the total content of 4-valent cations is greater than 0.5, preferably greater than 0.6, particularly preferably greater than 0.75.

The lithium contained functions in the glass ceramic according to the present disclosure as ionic conductor and is contained in the glass ceramic in an amount of at least 12 mole %, preferably at least 15 mole %, in the form of $Li_2O$. Further preferable are amounts of at least 18 mole %, at least 20 mole % and up to at least 22 mole %. The maximum of $Li_2O$ in the glass ceramic is 28 mole % and preferably 26 mole %, further preferably 24 mole %. A higher amount of lithium oxide does not result in advantages with respect to the lithium ion conductivity and may compromise the chemical stability of the glass ceramic.

Phosphorus oxide is used as glass former and also forms the skeleton structure of the crystal phase of the glass ceramic. Preferred are glass ceramics with a content of 32 to 42 mole % of $P_2O_5$, preferably 34 to 40 mole % and further preferably 36 to 38 mole %.

Aluminum oxide has the effect of a dopant and increases the conductivity of the crystal. However, contents of aluminum oxide which are too high result in the formation of foreign phases such as for example $AlPO_4$, which has disadvantageous effects onto the conductivity. The content of aluminum oxide ($Al_2O_3$) in the glass ceramic is 1 to 6 mole % $Al_2O_3$, preferably 2 to 5 mole %.

The contents of $Al_2O_3$ and $TiO_2$ are harmonized with one another, on the one hand, for avoiding the formation of foreign phases, and on the other hand, for avoiding an enrichment of both components in the residual glass phase which reduces the conductivity of the residual glass phase.

In order that the components $Al_2O_3$ and $TiO_2$ can completely be incorporated into the crystal phase and in order that the high conductivity can be achieved, the ratio of both oxides is 0.05 to 0.1.

For avoiding the formation of foreign phases, in particularly of $AlPO_4$, the glass ceramic has to comprise a sufficient amount of lithium oxide in relation to aluminum oxide. The value of the ratio of $Al_2O_3/Li_2O$ is greater than zero and less than 0.25.

A partial substitution of other trivalent elements, such as for example Y, La, Ga, Sc, etc., for trivalent cations of aluminum is possible, however normally due to cost reasons this is rather disadvantageous.

Polyvalent elements such as iron, chromium or vanadium (Fe, Cr, V) are preferably not used. Their proportion should be lower than 0.2 mole %, preferably lower than 0.1 mole % each.

Titanium dioxide is constituent of the main crystal phase and should be contained in the glass ceramic in a sufficient amount. Preferably, the glass ceramic according to the present disclosure contains 28 to 45 mole % of $TiO_2$, further preferably 36 to 42 mole %.

According to preferable embodiments a partial substitution of $ZrO_2$ for $TiO_2$ is possible, but in this case the proportion of $ZrO_2$ should be selected such that neither the total conductivity is reduced, nor that the sintering temperatures are increased too strong. Therefore, the content of $ZrO_2$ in mole % should be lower than the content of $TiO_2$ in mole %. In other words, the ratio of zirconium oxide to titanium oxide is always less than 1.

The optional addition of up to 10 mole % of $SiO_2$ can positively influence the glass formation and/or the sintering ability, wherein at higher contents, however, often foreign phases without ionic conductivity appear which reduces the total conductivity of the glass ceramic. Preferable values for the content of $SiO_2$ are 0 to 5 mole % and further preferably 0 to 3 mole %.

As further components the glass ceramic according to the present disclosure may contain other constituents, e.g. common fining and fluxing agents, such as $SnO_2$, $As_2O_3$ or $Sb_2O_3$, in common amounts of up to 3 mole %, preferably up to 1.5 mole %. However, due to environmental reasons, preferably no arsenic and antimony are used in the glass ceramics according to the present disclosure.

Further impurities which are "introduced" with the common technical raw materials should not exceed 1% by weight, preferably 0.5% by weight.

For avoiding the introduction of undesired alkali metal ions into the lithium battery, the glass ceramic should contain less than 0.5 mole % of other alkali metal oxides (apart from lithium oxide), preferably less than 0.2 mole % of other alkali metal oxides.

In the sense of this application a glass ceramic means a material which starting from a starting glass being produced by melting technology is converted in a controlled manner by a targeted temperature treatment into a glass ceramic (with glass phase and crystal phase). Here not included are materials with similar composition which are produced by solid-state reactions or sol-gel methods.

The glass ceramic can be produced either directly by ceramization from the starting glass (starting bulk glass) or by ceramization and sintering and/or pressing of starting glass powder.

The property of the starting glasses of being producible without spontaneous crystallization during casting is also an advantage for the sintering process, since contrary to already partially crystalline glass powder with glass powder which is not or only very less crystalline a more densely sintered glass ceramic can be produced.

The glass ceramics according to the present disclosure can be used as electrolyte in rechargeable lithium batteries, in particularly in lithium solid-state batteries. In this case they can be used either as thin layer or membrane as single electrolyte or as constituent of the electrolyte together with other materials (e.g. mixed with a polymer or an ionic liquid). For the production of such layers or membranes, besides the shaping possibilities of a starting glass (casting, drawing, rolling, floating, etc.), techniques such as screen printing, film casting or coating techniques can be used.

Also the use as coating on an electrode, e.g. with the application by sputtering methods or CVD methods, is possible. Furthermore, the glass ceramic can also be used as additive for the electrode (e.g. mixed with an electronically conducting material). Also the use as separator in a cell filled with a liquid electrolyte is conceivable.

With the help of the following examples the present disclosure will be explained in more detail.

EXAMPLES

The single starting glasses with the compositions shown in table 1 were molten at 1500 to 1650° C. and cast to flat ingots (thickness ca. 3 to 8 mm, diameter 30 to 40 mm) and quickly cooled to room temperature. As crucible material quartz glass crucibles or Pt/Rh crucibles were used.

From the starting glasses samples for the conductivity measurements (round discs with a diameter of 20 mm and a thickness of 1 mm) and XRD measurements were produced. After a nucleation in the temperature range of 500° C. to 600° C. for 0 to 4 hours the starting glasses were ceramicized (i.e. converted into glass ceramics) at maximum temperatures of 620 to 850° C. and residence times of 6 to 12 hours.

The ceramization temperatures used were determined with the help of a DTA measurement (heating rate 5 K/min).

Test polymer electrolytes were prepared in a glove box (MBraun, water/oxygen content<0.1 ppm). For that polyethylene oxide (PEO, molecular weight $10^6$ g/mol) was mixed with the conducting salt lithium bis(trifluoromethanesulfonyl)imide (LiTFSI) in the ratio Li:O=1:18. By hot pressing flexible membranes with a conductivity of less than $10^{-5}$ S/cm are achieved.

TABLE 1

| | Example 1 | | Example 2 | | Example 3 | | Example 4 | | Example 5 | | Comparative example 1 | |
|---|---|---|---|---|---|---|---|---|---|---|---|---|
| | mole % | % by weight | mole % | % by weight | mole % | % by weight | mole % | % by weight | mole % | % by weight | mole % | % by weight |
| $Al_2O_3$ | 3.491 | 3.753 | 3.491 | 3.725 | 3.456 | 3.725 | 3.456 | 3.682 | 3.638 | 3.888 | 9.00 | 9.75 |
| $Li_2O$ | 17.579 | 5.538 | 17.579 | 5.496 | 17.399 | 5.496 | 17.399 | 5.434 | 16.763 | 5.250 | 24.00 | 7.62 |
| $P_2O_5$ | 37.363 | 55.912 | 38.363 | 56.974 | 36.981 | 55.492 | 38.481 | 57.088 | 37.375 | 55.608 | 39.00 | 58.84 |
| $TiO_2$ | 39.568 | 33.330 | 39.568 | 33.077 | 39.164 | 33.079 | 39.164 | 32.704 | 41.225 | 34.525 | 28.00 | 23.78 |
| $B_2O_3$ | 2.000 | 1.468 | 1.000 | 0.728 | 3.000 | 2.208 | 1.500 | 1.091 | 1.000 | 0.730 | | |
| $Al_2O_3/TiO_2$ | 0.082 | | 0.082 | | 0.082 | | 0.082 | | 0.082 | | 0.3214 | |
| $Al_2O_3/Li_2O$ | 0.1986 | | 0.1986 | | 0.1986 | | 0.1986 | | 0.2170 | | 0.3750 | |
| Crystall. peak (DTA) | n.d. | | 633.9° C. | | n.d. | | 636.5° C. | | n.d. | | n.d. | |
| Ceramization | 850° C./12 h | | 850° C./12 h | | 850° C./12 h | | 850° C./12 h | | 850° C./12 h | | 950° C./12 h | |
| XRD | $Li_{1+x}Ti_{2-x}Al_x(PO_4)_3$ | | $Li_{1+x}Ti_{2-x}Al_x(PO_4)_3$ Secondary phase: $AlPO_4$ | | $Li_{1+x}Ti_{2-x}Al_x(PO_4)_3$ | | $Li_{1+x}Ti_{2-x}Al_x(PO_4)_3$ Secondary phase: $AlPO_4$ | | $Li_{1+x}Ti_{2-x}Al_x(PO_4)_3$ | | $Li_{1+x}Ti_{2-x}Al_x(PO_4)_3$ $AlPO_4$ | |
| Total conductivity glass ceramic (S/cm) | $2.16 \times 10^{-4}$ | | $1.83 \times 10^{-4}$ | | $2.19 \times 10^{-4}$ | | $2.5 \times 10^{-5}$ | | $2.4 \times 10^{-4}$ | | $8 \times 10^{-7}$ | |
| Grain conductivity glass ceramic (S/cm) | $9.65 \times 10^{-4}$ | | $8.96 \times 10^{-4}$ | | $1.28 \times 10^{-3}$ | | $6.66 \times 10^{-4}$ | | $6.51 \times 10^{-4}$ | | $1 \times 10^{-3}$ | |
| Conductivity of the residual glass phase (S/cm) | $2.79 \times 10^{-4}$ | | $2.30 \times 10^{-4}$ | | $2.65 \times 10^{-4}$ | | $2.6 \times 10^{-5}$ | | $3.8 \times 10^{-4}$ | | $<<10^{-6}$ | |

Figure 2:
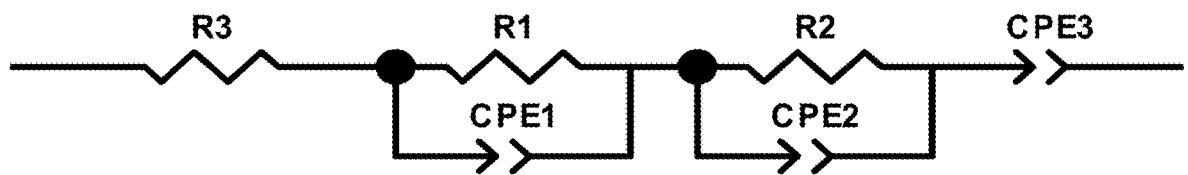
FIG. 2 shows a schematic diagram for a Nyquist model used to fit the measurement of FIG. 1.

The conductivity was measured with the help of frequency and temperature dependent impedance measurements (Alpha-A-High Performance Analyzer Mainframe of the company Novocontrol) in the range of $10^{-2}$ to $10^7$ Hz with a voltage amplitude of 20 mV at room temperature on samples being sputtered with gold. The measurements were evaluated with the help of the Nyquist plot (software: ZView of Scribner Associates, Inc.) which allows a separation of grain conductivity and conductivity of the residual phases (here the residual glass phase in sum with optional foreign phases) and the determination of the total conductivity. FIG. 1 shows a measuring curve of an impedance measurement of LATP materials being typical for an LiSICon sample. The measurement is fitted with the help of the Nyquist model based on the replacement schematic diagram shown in FIG. 2.

Figure 3:
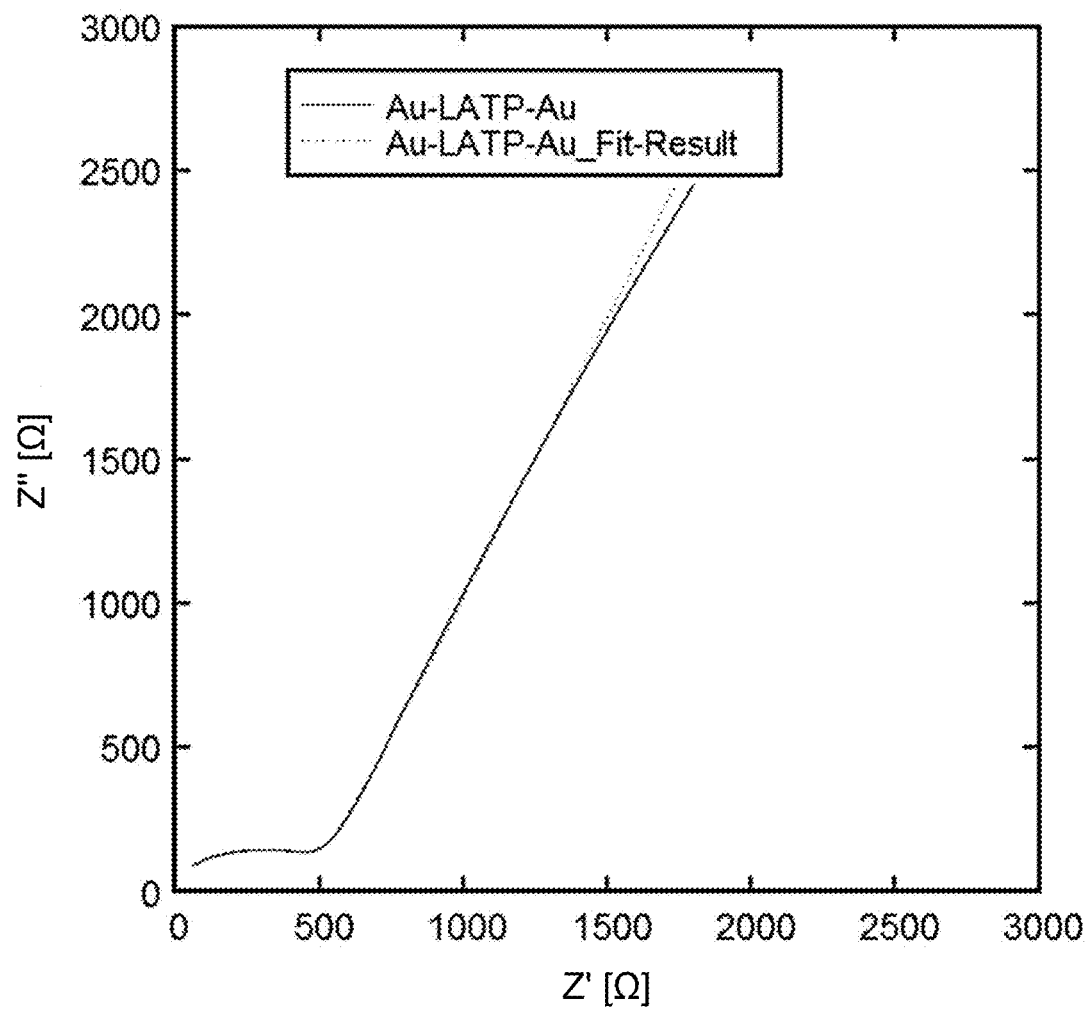
FIG. 3 shows an impedance measurement of a sample corresponding to example 2 of the present disclosure.

This results in two contributions to the conductivity which can be identified as semicircles. Due to the measured capacities the contributions can be allocated: the left, smaller semicircle corresponds to the grain conductivity, i.e. the conductivity of the crystallites. The second contribution summarizes the conductivity contributions of the residual constituents of the glass ceramic. It is dominated by the proportion with the best conductivity, wherein in the case of the glass ceramic according to the present disclosure this is the residual glass phase (the XRD shows only low amounts of foreign phases such as $AlPO_4$, which do not exhibit appreciable ionic conductivity). In the glass ceramics according to the present disclosure the conductivities and/or the capacities of the crystallites and the residual glass phase are closer together so that the contributions can only be separated with the help of a fit (see FIG. 3 which shows an impedance measurement at a sample corresponding to example 2).

The examples 1-5 in table 1 show the advantageous effect of the experimental compositions. From the described compositions, as described above, glass ceramic disks with a diameter of 12 mm were prepared which for contacting were sputtered with gold and then were measured by means of impedance spectroscopy.

The total conductivities are in the range of $10^{-4}$ S/cm, the grain conductivities even up to $10^{-3}$ S/cm. These high total conductivities of the glass ceramics are achieved, since the conductivities of the residual glass phase are also in the range of $10^{-5}$ S/cm to $10^{-4}$ S/cm. On the contrary, the comparative example 1 shows a composition without boron which also is characterized by a high grain conductivity of $10^{-3}$ S/cm, but the total conductivity thereof only amounts to $8\times10^{-7}$ S/cm.

TABLE 2

| | Example 6 | | Comparative example 2 | | Comparative example 3 | Comparative example 4 | Comparative example 5 |
|---|---|---|---|---|---|---|---|
| | mole % | % by weight | mole % | % by weight | mole % | mole % | mole % |
| $Al_2O_3$ | 3.38 | 3.65 | 4.000 | 4.230 | 6 | 4 | 6 |
| $Ga_2O_3$ | | | | | | | |
| $Li_2O$ | 17.96 | 5.69 | 16.000 | 4.960 | 18 | 20 | 18 |
| $P_2O_5$ | 37.08 | 55.80 | 38.000 | 55.980 | 40 | 34 | 38 |
| $TiO_2$ | 38.25 | 32.40 | 42.000 | 34.830 | 32 | 32 | 36 |
| $B_2O_3$ | 3.33 | 2.46 | | | 4 | 10 | 2 |
| $Al_2O_3/TiO_2$ | 0.0882 | | 0.0952 | | 0.1875 | 0.1250 | 0.1667 |
| $Al_2O_3/Li_2O$ | 0.1879 | | 0.2500 | | 0.3333 | 0.0200 | 0.3333 |
| Crystallization peak (DTA) | 652° C. | | 669° C. | | n.d. | n.d. | n.d. |
| Ceramization | 850° C./12 h | | 950° C./12 h | | | | no glass |
| XRD | $Li_{1+x}Ti_{2-x}Al_x(PO_4)_3$ | | $Li_{1+x}Ti_{2-x}Al_x(PO_4)_3$ | | $Li_{1+x}Ti_{2-x}Al_x(PO_4)_3$, $AlPO_4$, $LiTiPO_5$ | $Li_{1+x}Ti_{2-x}Al_x(PO_4)_3$, (traces: $AlPO_4$, $LiTiPO_5$) | |
| Sintering temp. | 850° C./12 h | | 1000° C./12 h | | 1000° C./30 min. | 1000° C./30 min. | |
| Conductivity, sintered | $4.4 \times 10^{-4}$ S/cm | | $1.3 \times 10^{-6}$ S/cm | | $1 \times 10^{-4}$ S/cm | $1.2 \times 10^{-4}$ S/cm | |
| Sintering temp. | 1200° C./12 h | | 1200° C./12 h | | | | |
| Conductivity, sintered | $3 \times 10^{-4}$ S/cm | | $1.1 \times 10^{-5}$ S/cm | | | | |

Due to the great difference between the grain conductivity and the conductivity of the residual glass phase the conductivity of the residual glass phase cannot be determined exactly, but it is estimated as $\ll 10^{-6}$ S/cm.

For the sintering trials in table 2 glass ribbons were prepared. For that the liquid glass was cast onto two rotating metal rollers. These ribbons were ceramicized at 850-950° C. for 12 h and subsequently ground. From the powder thus obtained moldings were prepared and sintered, which were then used for the determination of the conductivity.

Example 6 represents an example according to the present disclosure. It shows that it is possible that already at a sintering temperature of 850° C. sintered materials with a total conductivity of $4.4 \times 10^{-4}$ S/cm can be produced. This is not only reasonable in view of the energy costs, but also allows the reduction of the formation of foreign phases, such as $AlPO_4$, which starts at temperatures of 900° C., such as e.g. shown by Yu et al. in Functional Materials Letters, Vol. 9, No. 5 (2016) 1650066.

Further examples for the considerably improved sintering behavior which allows a reduction of the sintering temperatures to values which may be as low as 700° C. are shown in table 3.

It is shown that also at sintering temperatures of only 700° C. to 750° C. values of conductivity of up to $1 \times 10^{-3}$ S/cm can be realized.

TABLE 3

|  | Example 7 47818 | | Example 8 47820 | | Example 9 49617 | | Example 10 49952 | |
| --- | --- | --- | --- | --- | --- | --- | --- | --- |
|  | mole % | % by weight | mole % | % by weight | % by weight | % by weight | mole % | % by weight |
| $Al_2O_3$ | 3.456 | 3.725 | 3.638 | 3.888 | 3.41 | 3.68 | 3.41 | 3.68 |
| $Li_2O$ | 17.399 | 5.496 | 16.763 | 5.250 | 17.79 | 5.63 | 17.79 | 5.63 |
| $P_2O_5$ | 36.981 | 55.492 | 37.375 | 55.608 | 37.13 | 55.78 | 37.13 | 55.78 |
| $TiO_2$ | 39.164 | 33.079 | 41.225 | 34.525 | 38.68 | 32.70 | 38.68 | 32.70 |
| $B_2O_3$ | 3.000 | 2.208 | 1.000 | 0.730 | 3.00 | 2.21 | 3.00 | 2.21 |
| Al/Ti | 8.82% | | 8.82% | | 8.82% | | 8.82% | |
| Al/Li | 19.86% | | 21.70% | | 19.17% | | 19.17% | |
| Ceramization | 850° C./12 h | | 850° C./12 h | | 850° C./12 h | | 850° C./12 h | |
| XRD | $LiTi_2(PO_4)_3$ | | $LiTi_2(PO_4)_3$ | | $LiTi_2(PO_4)_3$, less $AlPO_4$ | | $LiTi_2(PO_4)_3$ | |
| Sintering temp. | 700° C./12 h | | 700° C./12 h | | 700° C./12 h | | 700° C./12 h | |
| Conductivity, sintered | $5 \times 10^{-4}$ S/cm | | $4.5 \times 10^{-4}$ S/cm | | $2 \times 10^{-4}$ S/cm | | $2.9 \times 10^{-4}$ S/cm | |
| Sintering temp. | 750° C./12 h | | 750° C./12 h | | 750° C./12 h | | 750° C./12 h | |
| Conductivity, sintered | $1 \times 10^{-3}$ S/cm | | $7.1 \times 10^{-4}$ S/cm | | $4.1 \times 10^{-4}$ S/cm | | n.d. | |
| Sintering temp. | 800° C./12 h | | 800° C./12 h | | 800° C./12 h | | 800° C./12 h | |
| Conductivity, sintered | $7 \times 10^{-4}$ S/cm | | $8.2 \times 10^{-4}$ S/cm | | $3.3 \times 10^{-4}$ S/cm | | $5.5 \times 10^{-4}$ S/cm | |
| Sintering temp. | 850° C./12 h | | 850° C./12 h | | 850° C./12 h | | 850° C./12 h | |
| Conductivity, sintered | $6.8 \times 10^{-4}$ S/cm | | $6.4 \times 10^{-4}$ S/cm | | n.d. | | n.d. | |

Comparative example 2 exhibits a composition without boron which requires considerably higher sintering temperatures of up to 1200° C. and in total achieves only a conductivity of $1.1 \times 10^{-5}$ S/cm.

Comparative example 3 from prior art describes known examples of LATP glass ceramics with boron addition (JP 2013 199386 A). However, comparative example 3 contains a ratio of $Al_2O_3/TiO_2$ which is too high in comparison to the present disclosure so that for a good conductivity a sintering temperature of 1000° C. is required. The same applies to comparative example 4, although here even a considerably higher content of boron was used.

Comparative example 5 shows the effect of a ratio of $Al_2O_3/Li_2O$ which is too high. The melt has not shown a sufficient glass formation.

In example 7 the transfer resistance of PEO to a glass ceramic with the composition of example 2 was determined.

Figure 4:
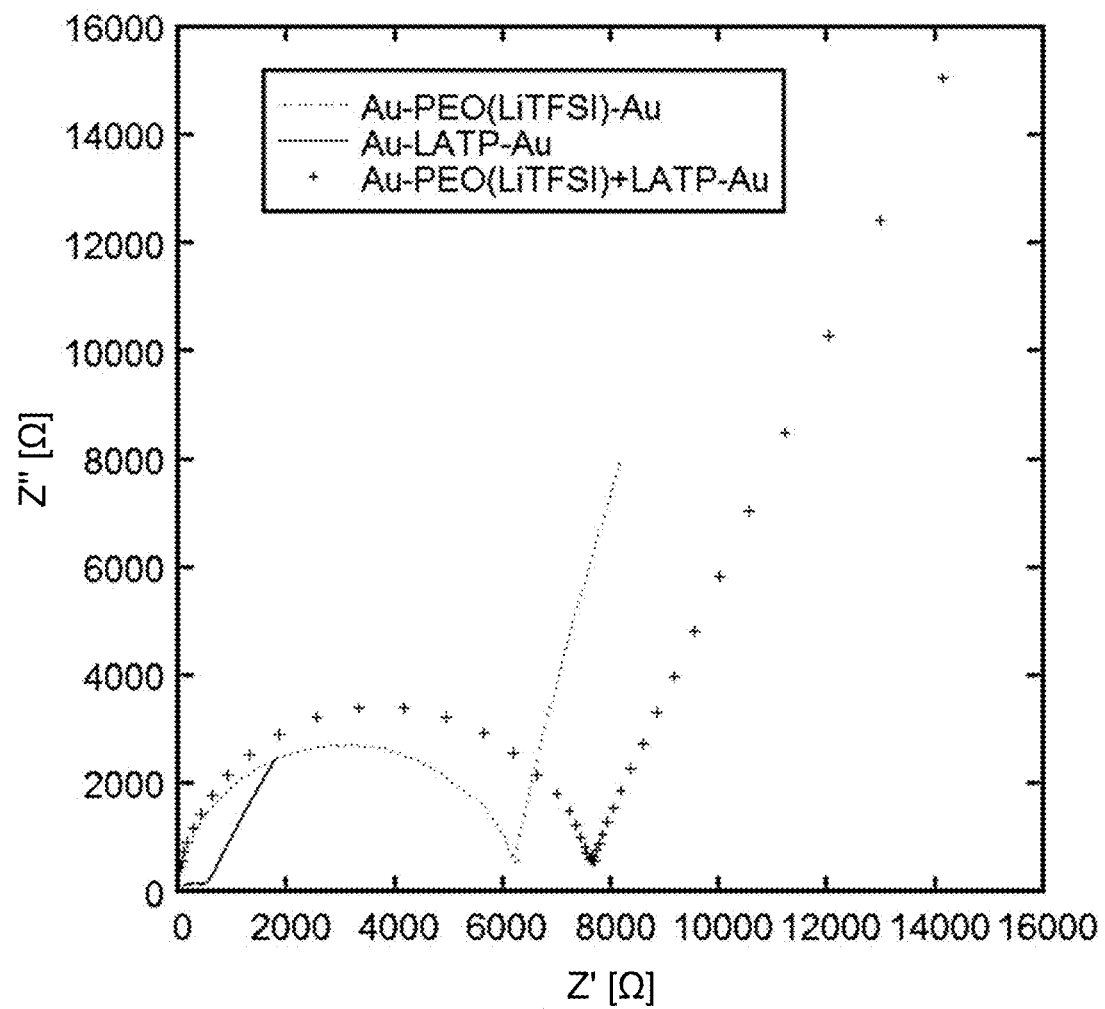
FIG. 4 shows the method for the determination of the transfer resistance from the glass ceramic to the polymer electrolyte.

FIG. 4 shows the method for the determination of the transfer resistance from the glass ceramic to the polymer electrolyte. Here, at 60° C. a PEO membrane was pressed onto the glass ceramic. So the resistances of the glass ceramic and the polymer as well as the transfer resistance were connected in series. When the resistances of the glass ceramic and the polymer are subtracted, then only the transfer resistance remains.

As can be seen in FIG. 4, it is not possible to separate the single contributions of the glass ceramic and the polymer, since the spectrum is dominated by the poor conductivity of PEO. Nevertheless, the total resistance can be determined. The sum of the contributions of the resistance of the glass ceramic and the transfer resistance is smaller than the resistance of the polymer, therefore the embedment of the glass ceramic according to the present disclosure as powder into PEO membranes is reasonable and increases the total conductivity of the hybrid system.

The transfer resistance between the glass ceramic (composition corresponding to example 2) and the PEO was determined to be 610/cm².

What is claimed is:

1. A lithium ion-conductive glass ceramic, comprising:
   a crystal phase; and
   a glass phase,
   wherein the crystal phase has the chemical composition $Li_{1+x-y}M_y^{5+}M_x^{3+}M_{2-x-y}^{4+}(PO_4)_3$, in which:
   $M^{3+}$=a trivalent cation of one or more elements,
   $M^{4+}$=a tetravalent cation of one or more elements,
   $M^{5'}$=a pentavalent cation of one or more elements,
   x is greater than 0 and at most 1,
   x is greater than y,
   y is 0 to 1, wherein
   (1+x−y) is greater than 1,
   wherein the crystal phase has at least $Al^{3+}$ as trivalent ion and at least $Ti^{4+}$ as tetravalent ion,
   wherein the glass phase has an ionic conductivity greater than $10^{-5}$ S/cm,
   wherein the glass phase comprises $Li_2O$, $P_2O_5$ and $B_2O_3$ and the content of $B_2O_3$ has values of 0.2 mole % to 4 mole %,
   wherein the glass ceramic has a molar ratio of $Al_2O_3/TiO_2$ with values of between 0.05 to 0.1, and
   wherein the 1.4-4.5% $Al_2O_3$ of $Al_2O_3/Li_2O$ 1.4-4.5% $Al_2O_3$ with values of between >0 and 0.25.

2. The glass ceramic according to claim 1, wherein the crystal phase $Li_{1+x-y}M_y^{5+}M_x^{3+}M_{2-x-y}^{4+}(PO_4)_3$ contains only $Al^{3+}$ as trivalent ion and only $Ti^{4+}$ as tetravalent ion.

3. The glass ceramic according to claim 1, wherein after the glass ceramic is ceramicized and/or sintered at a temperature of <1000° C., the glass ceramic has a total conductivity of higher than $10^{-4}$ S/cm at 22° C.

4. The glass ceramic according to claim 1, wherein after the glass ceramic is ceramicized and/or sintered at a temperature of <900° C. the glass ceramic has a total conductivity of higher than $10^{-4}$ S/cm at 22° C.

5. The glass ceramic according to claim 1, wherein the glass phase consists essentially of the components $Li_2O$, $B_2O_3$ and $P_2O_5$.

6. The glass ceramic according to claim 1, wherein the content of $B_2O_3$ is from 0.3 mole % to 3 mole %.

7. The glass ceramic according to claim 1, wherein the content of $B_2O_3$ is from 0.5 mole % to 2.5 mole %.

8. The glass ceramic according to claim 1, wherein the ratio of $Al_2O_3/Li_2O$ is less than 0.24.

9. The glass ceramic according to claim 1, wherein the ratio of $Al_2O_3/Li_2O$ is less than 0.22.

10. The glass ceramic according to claim 1, wherein the glass ceramic comprises the following composition in mole %:
    1.4-4.5% $Al_2O_3$,
    12-28% of $Li_2O$,
    32-42% of $P_2O_5$,
    28-45% of $TiO_2$,
    0.2%<$B_2O_3$<4%.

11. The glass ceramic according to claim 1, wherein the glass ceramic comprises the following composition in mole %:
    2-4.2% $Al_2O_3$,
    15-20% of $Li_2O$,
    34-40% of $P_2O_5$,
    36-42% of $TiO_2$, and
    0.5%<$B_2O_3$<2.5%.

12. The glass ceramic according to claim 1, wherein the glass ceramic is substantially free of at least one of the following: halides, arsenic, antimony, cadmium, and chromium.

13. The glass ceramic according to claim 1, wherein the glass ceramic is free of $GeO_2$.

14. The glass ceramic according to claim 1, wherein the glass ceramic is free of $GaO_2$.

15. The glass ceramic according to claim 1, wherein the glass ceramic has a content of $Fe_2O_3$ that is less than 0.2 mole %.

16. The glass ceramic according to claim 1, wherein the glass ceramic has a content of $Fe_2O_3$ that is less than 0.1 mole %.

17. The glass ceramic according to claim 1, wherein, when the glass ceramic is in contact with a polymer electrolyte, the glass ceramic has a transfer resistance of lower than 1000 Ω/cm².

18. A process for the production of the glass ceramic according to claim 1, the process comprising the steps of:
    a) melting the raw materials and homogenizing the starting glass,
    b) casting and cooling the starting glass,
    c) ceramicizing the starting glass at temperatures of between 750-1000° C.,
    d) grinding the ceramicized starting glass to a powder, and
    e) sintering the powder.

19. The process for the production of a glass-ceramic electrolyte material according to claim 18, wherein, during the ceramicizing step c), the starting glass is ceramicized at temperatures of between 850-950° C.

20. The process for the production of a glass ceramic material according to claim 18, wherein, during the sintering step e), the powder is mixed with an organic material.

21. The process for the production of a glass ceramic material according to claim 18, wherein, during the sintering step e), the powder is mixed with a polymer.

22. A battery comprising the glass ceramic of claim 1, wherein the battery is selected from the group consisting of: as a constituent, as an electrolyte, as part of an electrode, as an additive for a liquid electrolyte, as a constituent of a polymer electrolyte, as a constituent of a composite electrolyte, and as a coating on an electrode or a separator.

* * * * *

UNITED STATES PATENT AND TRADEMARK OFFICE
CERTIFICATE OF CORRECTION

PATENT NO. : 11,845,688 B2
APPLICATION NO. : 17/472824
DATED : December 19, 2023
INVENTOR(S) : Meike Schneider It is certified that error appears in the above-identified patent and that said Letters Patent is hereby corrected as shown below:

In the Claims

In Claim 1, at Column 15, Lines 32 to 33:
Delete "1.4-4.5% Al2O3 of Al2O3/Li2O 1.4-4.5% Al2O3"
And insert -- glass ceramic has a molar ratio of Al2O3/Li2O --

Signed and Sealed this
Twentieth Day of February, 2024

Katherine Kelly Vidal
*Director of the United States Patent and Trademark Office*